United States Patent
Inamura et al.

(10) Patent No.: US 7,674,367 B2
(45) Date of Patent: Mar. 9, 2010

(54) IRON-CONTAINING CRYSTALLINE ALUMINOSILICATE, HYDROCRACKING CATALYST COMPRISING THE ALUMINOSILICATE, AND METHOD OF HYDROCRACKING WITH THE CATALYST

(75) Inventors: Kazuhiro Inamura, Chiba (JP); Hiroshi Iida, Chiba (JP); Yoshihiro Okazaki, Chiba (JP); Akira Iino, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 187 days.

(21) Appl. No.: 11/719,860

(22) PCT Filed: Nov. 2, 2005

(86) PCT No.: PCT/JP2005/020233

§ 371 (c)(1),
(2), (4) Date: May 22, 2007

(87) PCT Pub. No.: WO2006/054447

PCT Pub. Date: May 26, 2006

(65) Prior Publication Data

US 2008/0087576 A1    Apr. 17, 2008

(30) Foreign Application Priority Data

Nov. 22, 2004   (JP)  ............................. 2004-336866

(51) Int. Cl.
*C10G 47/04*     (2006.01)

(52) U.S. Cl. .................... 208/110; 502/258; 423/328.1; 423/328.2

(58) Field of Classification Search ................ 208/110; 423/328.1–328.2; 502/258
See application file for complete search history.

(56) References Cited

U.S. PATENT DOCUMENTS

| | | | |
|---|---|---|---|
| 3,013,990 A | | 12/1961 | Breck et al. |
| 5,207,893 A | * | 5/1993 | Iwamoto et al. ........ 208/111.15 |
| 5,676,912 A | * | 10/1997 | Sharma et al. .......... 423/213.2 |
| 6,248,684 B1 | * | 6/2001 | Yavuz et al. .................. 502/66 |
| 6,328,880 B1 | | 12/2001 | Yoshita et al. |

FOREIGN PATENT DOCUMENTS

| | | |
|---|---|---|
| JP | 2 289419 | 11/1990 |
| JP | 04 240113 | 8/1992 |
| JP | 05 178611 | 7/1993 |
| JP | 2000 86233 | 3/2000 |

* cited by examiner

*Primary Examiner*—Robert J Hill, Jr.
*Assistant Examiner*—Brian McCaig
(74) *Attorney, Agent, or Firm*—Oblon, Spivak, McClelland, Maier & Neustadt, L.L.P.

(57) ABSTRACT

The present invention relates to an iron-containing crystalline aluminosilicate, a hydrocracking catalyst comprising the same and a process for hydrocracking utilizing the catalyst, and employing the catalyst in hydrocracking for heavy oil results in easy production of great quality kerosene and gas oil having low contents of sulfur and nitrogen as well as increased production thereof.

5 Claims, No Drawings

IRON-CONTAINING CRYSTALLINE ALUMINOSILICATE, HYDROCRACKING CATALYST COMPRISING THE ALUMINOSILICATE, AND METHOD OF HYDROCRACKING WITH THE CATALYST

TECHNICAL FIELD

The present invention relates to an iron-containing crystalline aluminosilicate, a hydrocracking catalyst comprising the same and a hydrocracking process employing the catalyst, in particular, to a hydrocracking catalyst comprising an iron-containing crystalline aluminosilicate and a hydrocracking process employing the catalyst, which results in easily increased production of good quality kerosene and/or gas oil having low contents of sulfur and nitrogen on hydrocracking of heavy oil.

BACKGROUND ART

In the past, hydrocracking processes of heavy oil such as residual oil or vacuum gas oil (VGO) contributed to increased production of as well as to desulfurization of an intermediate fraction including kerosene and gas oil through reasonable cracking thereof by loading a part or all of reactors with hydrocracking catalysts containing a crystalline aluminosilicate (referred to hereinafter as zeolite).

It has been well known that a catalyst comprising an iron-containing zeolite obtained by treating zeolite with an iron salt was particularly excellent for a hydrocracking activity because deterioration control thereof caused by coke formation is capable through the increased hydrogen transfer capability (for examples, Patent literatures 1 and 2).

However, the hydrocracking catalyst comprising the iron-containing zeolite has had the difficulty of yielding high selectivity of an intermediate fraction in the range of high cracking activity thereof, and produced a plenty of a light fraction such as naphtha since the increased production of the intermediate fraction showed signs of leveling off as a result of an over cracking.

Further, it was also of problem that the cracking activity of a heavy fraction (343 deg C.+, a boiling point of the fraction is higher than 343 deg C.) was particularly low.

More further, in the case of not in harmony between a hydrocracking activity and a hydrodesulfurization activity, a sulfur content in the intermediate fraction comprising mainly kerosene and gas oil resulted in high and a second treatment of the intermediate was required additionally.

Therefore, so as to improve selectivity for an intermediate fraction catalysts have been modified by treating zeolites with excessive steam (a high temperature treatment under steam atmosphere) or with acid in a low pH area, therefore a part of the zeolite was destroyed and a certain volume of mesopores was formed so as to be space for cracking a heavy fraction.

However, the above modification methods resulted in destruction of the framework of the zeolite, accordingly the formation of enough numbers of mesopores resulted in deteriorating the crystallinity thereof.

Therefore, there was of problem that the hydrocracking activity was not demonstrated adequately because of decreasing of the surface area thereof due to the crystallinity deterioration of the zeolite.

Patent literature 1: Japanese Patent Publication No. Heisei 6 (994)-074135

Patent literature 2: Japanese Patent Laid-Open Application No. 2000-86233

Patent literature 3: Japanese Patent No. 1739396

DISCLOSURE OF THE INVENTION

The present invention has been made from the above view points and is to provide an iron-containing crystalline aluminosilicate suitable for a carrier component of a hydrocracking catalyst having a excellent hydrocracking activity for hydrocarbon oil while maintaining a selectivity level for a intermediate fraction.

Further, the present invention is to provide a hydrocracking catalyst comprising the iron-containing crystalline aluminosilicate and a hydrocracking process for a hydrocarbon oil by employing the catalyst to be able to increase production, particularly, of an intermediate fraction in great quality (kerosene and/or gas oil) from heavy oil while maintaining a selectivity level for a intermediate fraction in hydrocracking for various types of hydrocarbon oil such as heavy oil.

Under such circumstances, as the result of intensive and extensive research and investigation on a catalyst having a further improved selectivity for an intermediate fraction and a higher hydrocracking activity, the present inventors have found that an iron-containing crystalline aluminosilicate comprising a specific composition and a specific pore volume (occasionally referred as an iron-containing zeolite) makes compatible improvement of an intermediate selectivity and maintaining improvement of desulfurization activity at high level while maintaining a high hydrocracking activity thereof, and have made the present inventions.

The present inventions have been completed according to aforementioned knowledge and information.

Namely, the present inventions provide the following;

1. An iron-containing crystalline aluminosilicate, characterized in meeting the following requirements (A and (B):

(A) the main component represented as oxides comprises the molar ratio of $SiO_2$ to $Al_2O_3$ having from 20 to 100, and the content as $Fe_2O_3$ therein of from 0.2 to 5.0% by mass, (B) the specific surface area thereof of 700 $m^2/g$ or more, and the total pore volume of the pore diameter with 200 nm or less comprises 0.6 mL/g or more.

2. A hydrocracking catalyst comprising supporting at least a metal, selected from the metals of the sixth group of the periodic table and of from the eighth to tenth groups thereof, on a carrier comprising from 5 to 85% by mass of the iron-containing crystalline aluminosilicate above 1 and from 95 to 15% by mass of an inorganic oxide.

3. A hydrocracking process for hydrocarbon oil employing the hydrocracking catalyst according to the aforementioned 2.

4. The hydrocracking process according to 3, wherein the hydrocarbon oil is heavy oil.

5. The hydrocracking process for hydrocarbon oil according to the aforementioned 4, wherein the heavy oil is at least one selected from heavy gas oil, vacuum gas oil, cracked gas oil, solvent deasphalted oil, atmospheric residue, vacuum residue, solvent deasphalted residue, thermal cracked residue, Coker oil, tar sand oil and shale oil.

BEST MODE FOR CARRYING OUT THE INVENTION

The main component, represented by oxide pattern, of the iron-containing zeolite comprises the molar ratio of $SiO_2$ to $Al_2O_3$ having from 20 to 100, preferably from 30 to 60 and $Fe_2O_3$ content therein of from 0.2 to 5.0% by mass, preferably from 0.2 to 5.0% by mass.

Further, (B) the iron-containing zeolite has the specific surface area of 700 m$^2$/g or more, and the overall pore volume of the pore diameter with 200 nm or less comprising 0.6 mL/g or more.

A hydrocracking catalyst employing the iron-containing zeolite of a specific surface area of 700 m$^2$/g or more as a carrier thereof is able to demonstrate good catalyst activity.

The specific surface area is generally about up to 850 m$^2$/g, preferably in the range of from 700 to 800 m$^2$/g, although there is no particular ceiling thereof.

In addition, when a pore volume of the pore diameter of 200 nm or less (referred to hereinafter as the total pore volume) is 0.6 mL/g or more, the catalyst employed the iron-containing zeolite as a carrier is able to demonstrate good catalyst activity.

The total pore volume is generally about 0.80 mL/g, preferably in the range of from 0.60 to 0.70 mL/g, although there is no particular ceiling thereof.

The following method is preferable so as to prepare the iron-containing zeolite.

Firstly, a starting material includes Na ion exchanged faujasite type zeolite, preferably Na ion exchanged Y-type zeolite. The Na ion exchanged Y-type zeolite has the molar ratio of silica to alumina (SiO$_2$Al$_2$O$_3$) of 4.8 or more, preferably 5.1 or more. Na$_2$O content therein is preferably in the range of from about 10.0 to about 15.0% by mass, more preferably in the range of from 12.0 to 14.0% by mass.

Further, the specific surface area thereof is 680 m$^2$/g or more, preferably 700 m$^2$/g or more.

In addition, the crystalline lattice constant evaluated by a X-ray diffraction peak (XRD) is preferably in the range of from 2.450 to 2.470 nm more preferably in the range of from 2.460 to 2.470 nm.

Next, the Na ion exchanged Y-type zeolite of the starting material is treated by an ion exchange treatment, followed by steaming so as to obtain a hydrogen ion exchanged Y-type zeolite having the high molar ratio of SiO$_2$ to Al$_2$O$_3$.

As a specific embodiment, according to conventional methods, the Na ion exchanged Y-type zeolite is treated with ammonium ion for an ion exchange so as to obtain NH$_4$ ion exchanged Y-type zeolite, followed by steaming. The steaming is carried out under a reasonable condition corresponding to various circumstances, preferably in the presence of steam in the range of from 540 to 810 deg C. The steam may be brought in from outside or absorbed water or crystallization water in the zeolite may be utilized for the steaming.

The steam-treated Y-type zeolite (abbreviated as USY: ultrastable γ type zeolite) obtained has silica to alumina of zeolite crystalline component (molar ratio SiO$_2$/Al$_2$O$_3$ in the framework) of 20 or more, preferably 30 or more.

Further, the Na$_2$O content is 1.0% by mass or less, preferably 0.30 by mass or less. Furthermore, the crystalline lattice constant (UD) evaluated by a X-ray diffraction peak (XRD) is in the range of from 2.425 to 2.445 nm, preferably in the range of from 2.430 to 2.440 nm.

When the molar ratio of SiO$_2$ to Al$_2$O$_3$ in the framework thereof and the Na$_2$O content and UD are in the ranges of aforementioned, dealumination from the zeolite framework is preceded, therefore the iron-containing zeolite obtained has good heat resistance and the crystallinity thereof is hardly destroyed during the subsequent treatment by an iron salt.

By adding a mineral acid to the steam-treated Y-type zeolite obtained, followed by mixing and stirring, further dealumination from the framework of zeolite and washing of the none framework aluminum are carried out.

Although there are various types of mineral acids, they include generally hydrochloric acid nitric acid, sulfuric acid, further inorganic acids such as phosphoric acid, perchloric acid, peroxodisulfonic acid, dithionic acid, sulfamic acid, nitrosulfonic acid and the like, and organic acids such as formic acid, trichloroacetic acid, trifluoroacetic acid and the like may be employed.

The amount of the mineral acid added is from 0.5 to 15 moles per kilogram of the zeolite, preferably from 3 to 11 moles per kilogram.

The concentration of the mineral acid is from 0.5 to 50% solution by mass, preferably from 1 to 20% solution by mass.

The treating temperature is in the range of from room temperature to 100 deg C., preferably in the range of from 50 to 100 deg C.

The treating time is from 0.1 to 12 hours.

Subsequently, by adding a sulfate of iron to the above, followed by mixing and stirring, supporting iron thereon, and further dealumination from the zeolite structure frame work and washing of the none framework aluminum are carried out.

When treating by the sulfate of iron, the treating temperature is generally in the range of from 30 to 100 deg C., preferably in the range of from 50 to 80 deg C., and the treating time is from 0.1 to 12 hours, preferably 0.5 to 5 hours, and also the treating pH is 2.0 or less, preferably 1.5 or less.

A sulfate of iron includes ferrous sulfate and ferric sulfate, and ferric sulfate is preferred. It is possible to add ferric sulfate thereto; however the solution thereof is preferable to add. Any solvent capable of dissolving an iron salt can be used, and water, alcohol, ether, ketone and the like are preferable to be used.

Further, the concentration of the sulfates of iron is generally from 0.02 to 10.0 mole/l, preferably from 0.05 to 5.0 mole/l.

When the zeolite is treated by adding the mineral acids and the sulfates of ion, the slurry ratio of the amount of the treating solution (litter) to mass of the zeolite (kg) is preferably in the range of from 1 to 50, more preferably in the range of from 5 to 30.

As aforementioned, supporting sulfates of iron on the zeolite while dealuminating from the zeolite at a low pH area results in the effective control of acid property of the zeolite and the effective creation of hydrogenation activity due to miniaturization of iron, therefore, it is believed that a good hydrocracking activity is realized.

The ion-containing zeolite as prepared above may be further washed by water, dried and calcined if necessary however, reasonable drying suitable for conveyance thereof may be recommendable.

A carrier to be employed for the hydrocracking catalyst of the present invention comprises the above iron-containing zeolite in the range of from 5 to 85% by mass and an inorganic oxide in the range of from 95 to 15% by mass. A suitable proportion thereof depends on a kind of hydrocarbon oil as feed stock. Namely, in the case of using heavy oil, as feed stock, such as atmospheric residue, vacuum residue, solvent deasphalted residue, thermal cracked residue, coker oil, tar sand oil and shale oil, the proportion of the iron-containing zeolite is preferably from 20 to 75% by mass, more preferably 45 to 70% by mass.

Further, in the case of using comparatively lighter heavy oil, as feed stock, such as heavy gas oil, vacuum gas oil, cracked gas oil and solvent deasphalted residue, the proportion of the iron-containing zeolite to the inorganic oxides is preferably from 5 to 60% by mass, more preferably 5 to 40% by mass.

The inorganic oxide includes porous and amorphous inorganic oxides to be used for conventional catalytic cracking processes, therefore hydrated oxides such as alumina (boehmite gel, alumina sol, etc.), silica (silica sol, etc.), silica-alumina, boria-alumina and the like may be used.

If the proportion of the iron-containing zeolite is too low, a higher reaction temperature is required so as to produce a desired intermediate fraction, therefore it affects the catalyst life adversely.

On the other hand, if the proportion of the on-containing zeolite is too high, the hydrocracking activity improved. However, the selectivity of an intermediate fraction decreases because formation of naphtha, gas and so forth increases due to over-cracking.

The composition comprising the iron-containing zeolite and the inorganic oxides is subjected to drying for from 0.1 to 24 hours at a temperature of 30 to 200 deg C., followed by calcining it for from 1 to 10 hours, preferably from 2 to 7 hours at the temperature of from 300 to 750 deg C., preferably from 450 to 700 deg C., so as to produce a carrier.

Subsequently, a metal supporting on the carrier includes at least a metal selected from the metals of the sixth group of the periodic table and of from the eighth to tenth groups of the periodic table. Here, a metal of the sixth group is preferably Mo and W, and a metal of from the eighth to tenth groups is preferably Ni, Co and Fe.

A combination of two metals includes Ni—Mo, Co—Mo, Ni—W, Co—W and the like, in particular Co—Mo and Ni—Mo preferably.

The amount of the metal component supported, which is not limited, may be reasonably decided depending on various conditions, and generally, the amount of a metal (as oxide) of the sixth group may be in the range of from 0.6 to 30% by mass, preferably from 5 to 20% by mass based on the total mass of the catalyst and the amount of a metal (as oxide) of from the eighth to tenth may be in the range of from 0.1 to 20% by mass, preferably from 1 to 10% by mass based on the total mass of the catalyst.

The metal component may be supported on the carrier by employing conventional methods such as an impregnation method, a kneading method and a co-precipitation method.

The carrier supported by one of the metals is subjected to drying in the range of from 0.1 to 24 hours at 30 to 200 deg C., followed by calcining in the range of from 1 to 10 hours (preferably from 2 to 7 hours) at 300 to 750 deg C. (preferably at 450 to 700 deg C.) so as to prepare the catalyst.

Of the physical properties of the catalyst supported by the metal component, the specific surface area (measured by BET method) is in the range of from 150 to 600 m$^2$/g, preferably from 200 to 500 m$^2$/g, and the pore volume (the total volume having 200 nm or less of pore diameter, evaluated by BJH methods of nitrogen adsorption method) is in the range of from 0.30 to 0.90 mL/g, preferably from 0.45 to 0.75 ml/g.

The catalyst may be employed for hydrocracking of heavy oil, heavily distillate, mixture thereof and the like, and also employed, in particular, for hydrocracking of vacuum gas oil and coker gas oil, and a reforming process of crude oil, of which naphtha fraction is removed.

A production process of hydrocracked oil being subjected to hydrocracking of hydrocarbon oil of the present invention is achieved though hydrocracking of hydrocarbon oil by employing the aforementioned catalyst.

Here, hydrocarbon oil as feed stock includes, although various types of oil may be employed without imitation, heavy gas oil, vacuum gas oil, cracked gas oil, coked gas oil, solvent deasphalted oil, atmospheric residue, vacuum residue, solvent deasphalted residue, thermal cracked residue, coker oil, tar sand oil, shale oil and the like, or mixture thereof.

Further, hydrocarbon oil as the other feed stock includes coal tar, tar sand oil and the like.

The hydrocracking catalyst may be employed preferably for heavy oil as feed stock of hydrocarbon oil.

The hydrocracking conditions employing the hydrocracking catalyst may utilize a wide variety of reaction conditions used for conventional hydrocracking processes. Although the specific reaction conditions varies depending on a kind of feed stock and so forth, and can not be decided uniformly, the reaction temperature is generally in the range of from 320 to 550 deg C., preferably from 350 to 430 deg C.

The partial pressure of hydrogen is in the range of from 1 to 30 MPa, preferably from 5 to 15 MPa. The ratio of hydrogen to a feed stock is in the range of from 100 to 2,000 Nm$^3$/kiloliter, preferably from 300 to 1,000 Nm$^3$/kiloliter. The liquid hourly space velocity (LHSV) may choose from the range of from 0.1 to 5 h$^{-1}$, preferably from 0.2 to 2.0 h$^{-1}$ appropriately.

Commonly, when hydrocracked oil is produced by treating heavy oil such as atmospheric residue, vacuum residue, solvent deasphalted residue, coker oil and the like in order to obtain naphtha, kerosene and gas oil, hydrocracking operation in the range of from 30 to 80% production yield is preferably carried out. Too much hydrocracking rate may result in increasing gas generation or accelerating the catalyst deterioration.

On the other hand, when hydrocracked oil is produced by treating lighter-heavy oil such as heavy gas oil, vacuum gas oil, cracked gas oil and coker gas oil the gas generation is lower than that even at almost 100% of hydrocracking rate so that it can be employed for production of naphtha, kerosene and gas oil at high cracking rate thereof.

The hydrocracking with recycling a part of product oil may result in controlling the gas generation at high hydrocracking rate or preventing the catalyst from deterioration.

Further, the hydrocracking process may employ the catalyst singly or in combination with conventional hydrocracking catalysts.

EXAMPLES

Next, the present invention will be described more specifically with reference to the following examples: however, the scope of the present invention is not limited by Examples.

Example 1a

Preparation of an Iron-Containing Zeolite A 1

A synthetic NaY type zeolite (Na$_2$O content: 13.5% by mass, SiO$_2$/Al$_2$O$_3$ molar ratio: 5.2, crystalline lattice constant: 2.466 nm) was treated by two times of an ammonium ion exchange and steaming cycle. The first steaming was carried out at 580 deg C. while keeping steam atmosphere by intentionally supplying water thereto, followed by carrying the second one out at 580 deg C., and then USY type zeolite (Na$_2$O content: 1.0% by mass or less, crystalline lattice constant: 2.435 nm) was obtained.

10 kg of the USY type zeolite was suspended in 115 litter of deionized water, followed by heating up to 75 deg C. and stirring for 30 minutes. Subsequently, 13.7 kg of sulfuric acid solution (10% by mass) was added into the suspension over 35 minutes, and then 11.5 kg of ferric sulfate solution (0.57 mole/l) was added therein over 10 minutes. After completion of the addition, further stirring for 30 minutes was carried out, followed by filtration and washing so as to obtain the iron-containing zeolite slurry A 1 having 30% by mass of the solid content.

After drying a part of the iron-containing zeolite slurry A 1, the specific surface area and the total pore volume of the iron-containing zeolite A 1 were measured.

The measuring conditions are as follows;

(1) The specific surface area and the total pore volume were worked out by numerical analysis of the adsorption/desorption isotherm of nitrogen at the temperature of the liquid nitrogen.

In the present invention, the zeolite showing a marked tendency of adsorbing moisture and so forth was heated at 400 deg C. for 3 hours under vacuum condition as pre-treatment thereof.

(2) As the specific surface area, BET surface area was derived from P/P0 of through P/P0=0.30 in the adsorption/desorption isotherm of nitrogen and the nitrogen adsorption amount obtained above (1).

(3) The total pore volume was the pore volume derived from converting the nitrogen adsorption amount at P/P0=0.99 in the adsorption/desorption isotherm of nitrogen obtained above (1) into the volume.

As the measurement results, the crystallinity obtained from XRD analysis, the crystalline lattice constant, together with $SiO_2/Al_2O_3$ molar ratio and $Fe_2O_3$ content which were obtained through a chemical composition analysis are shown Table 1.

Example 1b

Preparation of an Iron-Containing Zeolite A 2

The same procedure of Example 1a was repeated, except using a synthetic NaY type zeolite ($Na_2O$ content: 13.2% by mass, $SiO_2/Al_2O_3$ molar ratio: 5.2, crystalline lattice constant: 2.465 nm) different from the zeolite in Example 1a so as to obtain the iron-containing zeolite slurry A 2 and the iron-containing zeolite A 2 after drying a part of the slurry.

Example 1c

Preparation of an Iron-Containing Zeolite A 3

The same procedure of Example 1b using the same synthetic NaY type zeolite was repeated except that the second steaming was carried out at 570 deg C., and then the iron-containing zeolite slurry A 3 was obtained and the iron-containing zeolite A 3 deriving from drying a part of the slurry were obtained.

In this case, however, the crystalline lattice constant of USY zeolite obtained after the steaming was 2.437 nm.

Example 2

Preparation of Catalyst A 1

(1) Preparation of Alumina Slurry

To a stainless container having 200 litter of the inside volume equipped with a steam jacket, 80 kg of sodium aluminate solution ($Al_2O_3$ reduced concentration: 5.0% by mass) and 240 g of gluconic acid solution (70% by mass) were added, then it was heated to 60 deg C.

Subsequently, aluminum sulfate solution from a different container containing 88 kg of aluminum sulfate solution ($Al_2O_3$ reduced concentration: 2.5% by mass) prepared was added therein over 15 minutes so as to control pH 7.2 thereof and the aluminum hydroxide slurry (ready mixed slurry) was obtained.

Further, the ready mixed slurry was aged for 60 minutes while holding it at 60 deg C. Then, the water in the total ready mixed slurry was removed from it by using a flat plate filter, followed by washing with 600 litter of aqueous ammonia (0.3% by mass) holding at 60 deg C. to prepare alumina cakes.

The slurry of pH 10.5 containing 12.0% by mass of alumina concentration was prepared by using a part of the alumina cakes, deionized water and aqueous ammonia of 15% by mass. The slurry was added to a stainless aging tank with a reflux device and was aged for 8 hours at 95 deg C. white stirring.

Subsequently, to the aged slurry, deionized water was added and the slurry was diluted so as to make 9.0% by mass of alumina concentration thereof followed by transferring it to an autoclave with a stirrer, and then aged for 5 hours at 145 deg C.

Next, the above was condensed so as to make 20% by mass ($Al_2O_3$ reduced concentration) with heating and while removing ammonia, then the alumina slurry was obtained.

(2) Preparation of Catalyst Carrier 2,500 g of the iron-containing zeolite slurry A 1 (30% by mass concentration) prepared in Example 1 and 3,750 g of the alumina slurry (20% by mass concentration) were charged in a kneader, then it was condensed to be able to extrude it while heating and stirring, followed by extrusion thereof to mold tetraphyllous pattern pellets having the size of 1/22 inches. By drying them for 16 hours at 110 deg C. and then calcining them for 3 hours at 550 deg C., a catalyst carrier I of an iron-containing zeolite/alumina of 50/50 (the mass ratio of the reduced solid-content) was obtained.

(3) Catalyst Preparation

Subsequently, molybdenum trioxide and nickel carbonate were suspended into deionized water and the suspension was heated to 90 deg C., then malic acid was added thereto and dissolved. The solution was impregnated into the catalyst carrier I so as to contain 16.0% by mass as $MoO_3$ and 4.0% by mass as NiO respectively based on the total catalyst, followed by drying and then calcining for 3 hours at 550 deg C., and the catalyst A 1 (pellets) was prepared.

The specific surface area and the total pore volume of the catalyst A 1 were 405 $m^2/g$ and 0.60 mL/g respectively. The results are shown in Table 2.

In addition, the specific surface area and the total pore volume of the iron-containing zeolite A were worked out by the methods similar to those of the iron-containing zeolite A 1 in Example 1.

Example 3-1

Preparation of Catalyst A 2

The same procedure of Example 2 was repeated, except that the iron-containing crystalline zeolite/alumina of 10/90 (the mass ratio of the reduced solid content) was employed in place of 50/50 thereof in Example 2 (2), thus the catalyst carrier II-1 was obtained and then the catalyst A 2 (pellets) was prepared.

The specific surface area and the total pore volume of the catalyst A 2 were 245 $m^2/g$ and 0.70 mL/g respectively. The results are shown in Table 2.

In addition, the specific surface area and the total pore volume of the iron-containing zeolite A 1 were worked out the methods similar to those of the iron-containing zeolite in Example 1.

Example 3-2

Preparation of Catalyst A 3

The same procedure of Example 2 was repeated except that an iron-containing zeolite/alumina of 30/70 (the mass ratio of the reduced solid-content) was used in place of the iron-containing zeolite/alumina in Example 2 (2) so as to obtain the catalyst carrier II-2 and then the catalyst A 3 (pellets)

Example 3-3

Preparation of Catalyst A 4

The same procedure of Example 2 (2) using the iron-containing zeolite slurry A 2 was repeated except that an iron-containing zeolite/alumina of 60/40 (the mass ratio of the reduced solid-content) was used in place of the iron-containing zeolite/alumina in Example 2 (2) so as to obtain the catalyst carrier II-3.

Subsequently, the same procedure of Example 2 (3) was repeated except that the metals were impregnated so as to contain 4.2% by mass as CoO and 10.5% by mass as $MoO_3$ therein by replacing nickel carbonate with cobalt carbonate, and the catalyst A 4 (pellets) was obtained.

Example 3-4

Preparation of Catalyst A 5

Into the alumina slurry obtained by the same procedure of Example 2 (1), boric acid was added so as to make 85/15 of the mass ratio of $Al_2O_3/B_2O_3$ and then alumina-boric acid slurry was obtained.

The alumina-boric acid slurry and the iron-containing zeolite slurry A 2 were charged in a kneader so as to make 80/20 (the mass ratio of the reduced solid-content) thereby, and then extruded thereof to mold pellets while heating and stirring, followed by drying at 110 deg C. for 12 hours and calcining them at 550 deg C. for 3 hours to produce the carrier II-4. Further, the same procedure of Example 2 (3) was repeated and the catalyst A 5 (pellets, containing 4.0% by mass of NiO and 16.0% by mass of $MoO_3$) was obtained.

Example 3-5

Preparation of Catalyst A 6

The same procedure of Example 3-4 was repeated except using the iron-containing zeolite slurry A 3 and the catalyst A 6 (pellets) was obtained.

Comparative Example 1a

Preparation of Iron-Containing Zeolite B 1

A synthetic NaY type zeolite ($Na_2O$ content: 13.3% by mass, $SiO_2/Al_2O_3$ molar ratio: 5.0) was treated by two times of an ammonium iron exchange and steaming cycle, the second steaming was carried out at 590 deg C., and USY type zeolite ($Na_2O$ content: 1.3% by mass, the crystalline lattice constant; 2.440 nm) was obtained. 10 kg of the USY type zeolite was suspended in 15 liter of deionized water, followed by heating up to 75 deg C. and stirred for 30 minutes.

Subsequently, 81.9 kg of nitric acid solution (10% by mass) was added into the suspension over 35 minutes, and then 23.0 kg of ferric sulfate solution (0.57 mole/l concentrations) was added therein over 10 minutes. After completion of the addition, further stirring for 30 minutes was carried out, followed by filtration and washing so as to obtain the iron-containing zeolite slurry B 1 having 30.5% by mass of the solid concentration.

After drying a part of the iron-containing zeolite slurry B 1, the specific surface area and the total pore volume of the iron-containing zeolite B 1 were measured.

In addition, the specific surface area and the total pore volume of the iron-containing B 1 were worked out the methods similar to those of the iron-containing zeolite A 1 in Example 1a.

The results are shown in Table 1.

Comparative Example 1b

Preparation of Iron-Containing Zeolite B 2

The same procedure of Comparative Example 1a was repeated, except that the second steaming was carried out at 580 deg C. and then the iron-containing zeolite slurry B 2 and the iron-containing zeolite B 2 derived from drying a part of the slurry were obtained.

In this case, however, the crystalline lattice constant of USY zeolite obtained after the steaming was 2.442 nm.

Comparative Example 2-1

Preparation of Catalyst B 1

(1) The Preparation of Alumina Slurry was Conducted According to the Similar Way of Example 2.

(2) Preparation of Catalyst Carrier 3,200 g of the iron-containing zeolite slurry B (30.5% by mass of concentration) prepared in Comparative Example 2 and 2,625 g of the alumina slurry (20% by mass of concentration) were charged in a kneader, then it was condensed to be able to extrude while heating and stirring, followed by extrusion thereof to mold tetraphyllous pattern pellets having the size of ½₂ inches.

By drying them for 16 hours at 110 deg C. and then calcining the for 3 hours at 550 deg C., a catalyst carrier III-1 of an iron-containing zeolite/alumina of 65/35 (the mass ratio of the reduce solid-content) was obtained.

(3) Catalyst Preparation

Subsequently, molybdenum trioxide and nickel carbonate was suspended into deionized water and the suspension was heated to 90 deg C., then ma c acid was added thereto and dissolved. The solution was impregnated into the catalyst carrier II so as to contain 10.0% by mass of $MoO_3$ and 4.25% by mass of CoO respectively based on the catalyst, followed by drying and calcining for 3 hours at 550 deg C., and then the catalyst B 1 was prepared.

The specific surface area and the total pore volume of the catalyst B 1 were 455 $m^2/g$ and 0.62 mL/g respectively.

The results are shown in Table 2.

In addition, the specific surface area and the total pore volume of the iron-containing zeolite B were worked out by the methods similar to those of the iron-containing zeolite A 1 in Example 1.

Comparative Example 2-2

Preparation of Catalyst B 2

By using an iron-containing zeolite/alumina of 50/50 (the molar ratio of the reduced solid-content) in place of the iron-containing zeolite/alum in a of 65/35 of Comparative Example 2-1 (2), the catalyst carrier III-2 was obtained and then the catalyst B 2 (pellets) was obtained by conducting the same procedure of Example 2.

Comparative Example 2-3

Preparation of Catalyst B 3

The same procedure of Example 3-4 was repeated except that the iron-containing zeolite slurry A 2 was replace by B 1 thereof in Comparative Example 1a, and the catalyst carrier III-3 and the catalyst B 3 (pellets) were obtained.

Comparative Example 2-4

Preparation of Catalyst B 4

The same procedure of Comparative Example 2-3 was repeated except that the iron-containing zeolite slurry B 2 obtained by Comparative Example 1b was used and the catalyst carrier III-4 and the catalyst B 4 (pellets) were obtained.

Additionally, the conventional hydrodesulfurization catalyst C 1 (pellets, alumina carrier, Co—Mo based) was employed.

TABLE 1

|  | Units | Iron-containing zeolite | | | | |
|---|---|---|---|---|---|---|
|  |  | A1 Example 1a | A2 Example 1b | A3 Example 1c | B1 Comparative Example 1a | B2 Comparative Example 1b |
| Molar ratio of $SiO_2/Fe_2O_3$ | — | 50 | 44 | 40 | 40 | 37 |
| $Fe_2O_3$ | % by mass | 1.1 | 1.2 | 1.5 | 2.6 | 3.5 |
| Specific surface area | $m^2/g$ | 740 | 750 | 739 | 690 | 683 |
| Totall pore volume | mL/g | 0.63 | 0.62 | 0.60 | 0.55 | 0.53 |
| Crystallinity* | % | 130 | 121 | 115 | 97 | 75 |
| Crystalline lattice constant (UD) | nm | 2.434 | 2.435 | 2.433 | 2.432 | 2.430 |

*The relative crystallinity represented by Crystallinity of Y-type zeollite is shown by LindeSK-40 as 100% (calculated from the intensity of the main diffraction peak of XRD)

TABLE 2

|  | Units | Catalyst | | | | | |
|---|---|---|---|---|---|---|---|
|  |  | A1 Example 2 | A2 Example 3-1 | A3 Example 3-2 | A4 Example 3-3 | A5 Example 3-4 | A6 Example 3-5 |
| Iron-containing zeolite slurry |  | A1 | A1 | A1 | A2 | A2 | A3 |
| Iron-containing zeolite/boria/alumina | ratio % by mass | 50/0/50 | 10/0/90 | 30/0/70 | 60/0/40 | 20/12/68 | 20/12/68 |
| CoO | % by mass | 0.0 | 0.0 | 0.0 | 4.2 | 0.0 | 0.0 |
| NiO | % by mass | 4.0 | 4.0 | 4.0 | 0.0 | 4.0 | 4.0 |
| $MoO_3$ | % by mass | 16.0 | 16.0 | 16.0 | 10.5 | 16.0 | 16.0 |
| Specific surface area | $m^2/g$ | 405 | 245 | 318 | 480 | 270 | 265 |
| Total pore volume | mL/g | 0.60 | 0.70 | 0.60 | 0.76 | 0.43 | 0.42 |

|  |  | Units | Catalyst | | | |
|---|---|---|---|---|---|---|
|  |  |  | B1 Compartive Example 2-1 | B2 Compartive Example 2-2 | B3 Compartive Example 2-3 | B4 Compartive Example 2-4 |
|  | Iron-containing zeolite slurry |  | B1 | B1 | B1 | B2 |
|  | Iron-containing zeolite/boria/alumina | ratio % by mass | 65/0/35 | 50/0/50 | 20/12/68 | 20/12/68 |
|  | CoO | % by mass | 4.3 | 0.0 | 0.0 | 0.0 |

TABLE 2-continued

|  |  |  |  |  |
|---|---|---|---|---|
| NiO | % by mass | 0.0 | 4.0 | 4.0 | 4.0 |
| MoO$_3$ | % by mass | 10.0 | 16.0 | 16.0 | 16.0 |
| Specific surface area | m$^2$/g | 455 | 400 | 260 | 255 |
| Total pore volume | mL/g | 0.62 | 0.58 | 0.40 | 0.38 |

The hydrocracking activities of the catalysts A (Example 2), A 2 (Example 3-1), A 3 Example 3-2), A 4 (Example 3-3), A 5 (Example 3-4), A 6 (Example 3-5), B 1 (Comparative Example 2-1), B 2 (Comparative Example 2-2), B 3 (Comparative Example 2-3), B 4 (Comparative Example 2-4) and the conventional hydro-desulfurization catalyst C 1 were evaluated as follows:

(1) Examples 4 to 5 and Comparative Examples 3 to 4

Hydrocracking of the Mixture of Coker Gas Oil (CGO)/Vacuum Gas Oil (VGO)

As a pre-treatment catalyst of feed stock, 33.3% by volume of the hydrodesulfurization catalyst C 2 (pellet, alumina based conjugated oxide carrier, Co—Mo based) vas charged into the first part of a high-pressure fixed bed reactor, followed by charging 33.3% by volume of each catalyst of A 1, A 2, A 4, B 1, B 2 and C 1 into the intermediate part of the reactor separately, and then 33.3% by volume of C 1 as a post-treatment of the treated oil as charged into the last part of the reactor (the total 100 ml of the catalyst pellets). Subsequently, synthetic oil containing 2.5% by mass of sulfur derived from adding dimethyl sulfide in straight run gas oil to control sulfur content of the synthetic oil was fed to the reactor upwardly in the condition of 1.0 h$^{-1}$ of the liquid hourly space velocity (LHSV), 10 MPa of the hydrogen partial pressure and 800 NM$^3$/kL of the ratio of hydrogen to the synthetic oil and the reaction temperature was elevated step wisely, then finally to 330 deg C. for presulfiding the catalysts.

Subsequently, while holding 330 deg C. of the temperature, by employing CGO/VGO mixed oil (3.2% by mass of sulfur content, 0.15% by mass of nitrogen, 0.935 g/cm$^3$ of density, and the volume ratio thereof was 40 to 60), hydrocracking was conducted under the conditions of 380 deg C. and 390 deg C. of the reaction temperature, 0.6 h$^{-1}$ of the liquid hourly space velocity (LHSV), 10 MPa of the hydrogen partial pressure and 800 NM$^3$/kL of the ratio of hydrogen to the mixed oil.

The results were shown in Table 3-1 (Reaction temperature: 380 deg C.) and Table 3-2 (Reaction temperature: 390 deg C.)

TABLE 3-1

(Reaction temparature; 380 deg C.)

| | Catalyst | | | | | |
|---|---|---|---|---|---|---|
| | A1 Example 4a | A2 Example 5a | A4 Example 4a2 | B1 Comparative Example 3a | C1 Comparative Example 4a | B2 Comparative Example 3a2 |
| Conversion for 343 deg. C.+ (%) | 31.5 | 29.5 | 35.0 | 35.0 | 26.0 | 31.0 |
| Yield of intermediate fraction (%) | 37.0 | 36.0 | 40.0 | 39.0 | 34.4 | 36.0 |
| Sulfur content in gas oil fraction (mass ppm) | 8 | 7 | 8 | 19 | 15 | 17 |
| Nitrogen content in gas oil fraction (mass ppm) | <1 | <1 | <1 | <1 | 2 | 2 |

TABLE 3-2

(Reaction temperature 390 deg C.)

| | Catalyst | | | | | |
|---|---|---|---|---|---|---|
| | A1 Example 4a | A2 Example 5b | A4 Example 4b2 | B1 Comparative Example 3b | C1 Comparative Example 4b | B2 Comparative Example 3b2 |
| Conversion for 343 deg | 48.0 | 39.5 | 57.5 | 58.7 | 32.0 | 47.0 |
| Yield of intermediate fraction (%) | 45.2 | 42.5 | 53.0 | 47.5 | 38.7 | 43.0 |

TABLE 3-2-continued (Reaction temperature 390 deg C.)

| | Catalyst | | | | | |
|---|---|---|---|---|---|---|
| | A1 Example 4a | A2 Example 5b | A4 Example 4b2 | B1 Comparative Example 3b | C1 Comparative Example 4b | B2 Comparative Example 3b2 |
| Sulfur content in light oil fraction (mass ppm) | 7 | 6 | 5 | 46 | 12 | 35 |
| Nitrogen content in light oil fraction (mass ppm) | <1 | <1 | <1 | <1 | 1 | 2 |

From Table 3-1 and Table 3-2, it is understood that the catalyst A 1 (Examples 4a and 4b) and the catalyst A 4 (Example 4a2 and 4b2) is well balanced, as a whole, over the relation to the conversion (of fraction higher than 343 deg C.), the intermediate fraction (of kerosene and gas oil) yield, the removal rate of sulfur and nitrogen.

The catalyst A2 (Examples 5a and 5b) resulted in that the selectivity of the intermediate fraction (of kerosene and gas oil) became high and the property of the gas oil obtained (removal rate of sulfur and nitrogen) was good through controlling the cracking rate.

The catalyst B 1 (Comparative Examples 3a and 3b) and the catalyst B 2 (Comparative Examples 3a2 and 3b2) resulted in the high conversion and the high intermediate fraction yield, and the properties (particularly of sulfur removal rate) of gas oil obtained was similar to those of the conventional hydro-desulfurization catalyst C 1 (Comparative 4a and 4b).

(2) Example 6 and Comparative Example 5

Hydrocracking of Naphtha-Cut Crude Oil

28% by volume of the conventional demetalization catalyst D (pellet, alumina carrier, Ni—Mo based) was charged into the first reaction tube of 100 mL, followed by charging 33% by volume of each catalyst A 1 and B 1 into the intermediate reaction tube of 100 mL separately and 39% by volume of the hydrodesulfurization catalyst C 2 was charged into the last reaction tube of 100 mL, then the three tubes were connected serially in this order, followed by hydrocracking.

As feed stock, Arabian heavy crude oil, of which the naphtha fraction was removed therefrom, was fed into the reaction tube and then the hydrocracking was conducted for 1,500 hours under the conditions of 135 kg/cm$^2$G (13.23 MPaG) of the hydrogen partial pressure, 600 Nm$^3$/kl of the mole ratio of hydrogen to the feed oil, 380 deg C. for the first tube, 400 deg C. for the intermediate tube and 360 deg C. for the last tube as the reaction temperature, and 0.408 h$^{-1}$ of the liquid hourly space velocity (LHSV).

By fractionating the produced oil through a distillation apparatus with 15 columns, LPG (propane+butane), naphtha fraction (pentane to 157 deg C.), kerosene fraction (157 to 239 deg C.), gas oil fraction (239 to 343 deg C.) and atmospheric residue (over 343 deg C.) were obtained, followed by measurement of the properties of each fraction. The yields and properties of each product obtained were shown in Table 5.

TABLE 4

| Item | Unit | Measuring method | | Naphtha-cut Arabian crude oil |
|---|---|---|---|---|
| Density(@15 deg C.) | g/cm$^3$ | Vibration type density test | JIS K-2249 | 0.9238 |
| Sulfur content | % by mass | Fuorescent X-ray analysis | JIS K-2541 | 3.19 |
| Nitrogen content | ppm by mass | Chemiluminescence analysis | JIS K-2609 | 1640 |
| Vanadium | ppm by mass | Fluorescent X-ray analysis | JPI 5S-59-99 | 56.5 |
| Nickel | ppm by mass | Fluorescent X-ray analysis | JPI 5S-59-99 | 17.9 |
| Insoluble in n-C7 | % by mass | | | 5.11 |
| Carbon residue | % by mass | Micro method | JIS K-2270 | 9.15 |
| Kinetic viscosity (@50 deg C.) | mm$^2$/s | | JIS K-2283 | 37.70 |
| Distillation characteristics | deg C. | | | |
| IBP | | | | |
| 5% by mass | | | | 101 |
| 10% by mass | | | | 168 |
| 20% by mass | | | | 203 |
| 30% by mass | | | | 268 |
| 40% by mass | | | | 327 |
| 50% by mass | | | | 388 |
| 60% by mass | | | | 450 |
| 70% by mass | | | | 514 |
| EP | | | | |

TABLE 5

| | Item | Yield to feedstock (Vol %) | Density (g/ml) | Sulfur content (ppm by mass) | Nitrogen content (ppm by mass) | Total aromatics (Vol %) | Cetane index |
|---|---|---|---|---|---|---|---|
| Example 6 | LPG | 3.1 | 0.5575 | — | — | — | — |
| | Naphta fraction | 33.5 | 0.7290 | 2 | 1> | 6 | — |
| | Kerosene farction | 22.6 | 0.7955 | 2 | 1> | 9 | — |
| | Gas oil fraction | 18.3 | 0.8155 | 10 | 1> | 10 | 72.1 |
| | Atmospheric residue | 30 | 0.9577 | 15000 | 2380 | — | — |
| Comparative Example 5 | LPG | 3.6 | 0.5572 | — | — | — | — |
| | Naptha fraction | 37.3 | 0.7286 | 22 | 1> | 13 | — |
| | Kerosene farction | 20.9 | 0.7961 | 5 | 2 | 19 | — |
| | Gas oil fraction | 1.2 | 0.8164 | 130 | 9 | 19 | 65.1 |
| | Atmospheric residue | 30 | 0.9577 | 18000 | 2520 | — | — |

From Table 5, it is understood that the catalyst A 1 (Examples 6) results in a higher yield of the kerosene and gas oil fraction, lower aromatic contents all over the fractions and better properties (the removal rates of sulfur and nitrogen) of the fractions obtained than those of the catalyst B 1 (Comparative Example 5).

Example 7, Comparative Examples 6 and 7

Hydro-Treatment of Atmospheric Residue

Example 7

26% by volume of each catalyst of the conventional demetalization catalyst D (pellet, alumina carrier, Ni—Mo based), the conventional hydrodesulfurization catalyst C 1 pellet, alumina carrier Co—Mo based), the hydrocracking catalyst A 1 and the hydro-desulfurization catalyst C 1 was charged in each reaction tube of 100 mL respectively, and connected them serially in his order, followed by hydrogenation treatment.

As feed stock, a Kuwait atmospheric residue shown in Table 6 was fed in the reaction tube and the hydrogen treatment was carried out for 2000 hours to obtain product oil while controlling the sulfur content of a fraction of 360 deg C. or more of the product oil to 0.6% by mass, under the reaction conditions of 10.3 MPaG of the hydrogen partial pressure, 800 Nm$^3$/kl of the ratio of hydrogen to feed oil, setting 355 deg C. for the reaction tube charged with the demetalization catalyst D and 400 deg C. for the reaction tube charged with the hydrocracking catalyst A 1, 28 h$^{-1}$ of the liquid hourly space velocity (LHSV) thereof.

The yields of the intermediate fraction (from 160 to 360 deg C.) were shown in Table 7.

Comparative Example 6

The hydrogen treatment was carried out similar to Example 7, except that the hydrocracking catalyst A 1 of the third reaction tube was replaced with the conventional hydrocracking catalyst B 1. The result was shown in Table 7.

Comparative Example 7

The hydrogen treatment was carried out similar to Example 7, except that the hydrocracking catalyst A 1 of the third reaction tube was replaced with the conventional hydrodesulfurization catalyst C 1, the temperature of the reaction tube charged with the demetalization catalyst D was set at 355 deg C., and the temperatures of the other reaction tubes were controlled so as to obtain product oil, of which a fraction of 360 deg C. or more having 0.6% by mass of sulfur content. The results were shown in the Table 7.

TABLE 6

| Item | Unit | Measuring method | | Kuwait atmospheric residue |
|---|---|---|---|---|
| Density (@15 deg C.) | g/cm$^3$ | Vibration type density test | JIS K-2249 | 0.985 |
| Sulfur content | % by mass | Fuorescent X-ray analysis | JIS K-2541 | 4.5 |
| Nitrogen content | ppm by mass | Chemiluminescence analysis | JIS K-2609 | 2460 |
| Vanadium | ppm by mass | Fuorescent X-ray analysis | JPI 5S-59-99 | 62 |
| Nickel | ppm by mass | Fuorescent X-ray analysis | JPI 5S-59-99 | 19 |

TABLE 7

| Catalyst species | Example 7 (A1) | Comaparative Example 6 (B1) | Comparative Example 7 (C1) |
|---|---|---|---|
| Average temperature of catalyst (deg C.) | 385 | 392 | 383 |
| Conversion for fraction of 360 deg C. or more (% by mass) | 21.5 | 22.3 | 13.7 |
| Yield of intermediate fraction * (% by mass) | 25.0 | 23.8 | 17.5 |

* intermediate fraction means a distillate of from 160 to 360 deg. C.

Table 7 shows the higher yield of an intermediate fraction in the case of the catalyst A1 (Example 7) than ones in the case of the catalyst B1 (Comparative Example 6) and the catalyst C1 (Comparative Example 7).

(4) Examples 8 to 10, Comparative Examples 8 and 9

Hydrocracking Reaction of Heavy Distillate

50% by volume of the conventional hydrotreating catalyst N 1 (pellets, alumina carrier, Co—Mo based) and 50% by volume of each catalyst prepared above (the catalyst A 3, the catalyst A 5, the catalysts A 6 and B 3, or the catalyst B 4) were charged into a high pressure fixed bed reactor and followed by presulfiding them by using a conventional method. Subsequently, heavy gas oil derived from a middle-east based crude oil as feed stock was hydrocracked in the condition of $1.0\ h^{-1}$ of the liquid hourly space velocity (LHSV), 110 kg/cm$^2$G (10.79 MPaG), 385 deg C. of reaction temperature and 1,000 Nm$^3$/kL of the ratio of hydrogen to the feed stock.

The characteristics of heavy gas oil is shown in Table 8, and the obtained-catalyst activities of the catalyst A 3 (Example 8), the catalyst A 5 (Example 9), the catalysts A 6 (Example 10) and B 3 (Comparative Example 8), and the catalyst B 4 (Comparative Example 9) are shown in Table 9.

TABLE 8

| Item | Unit | Measuring method | | Heavy gas oil |
|---|---|---|---|---|
| Density (@15 deg C.) | g/cm$^3$ | Vibration type density test | JIS K-2249 | 0.923 |
| Sulfur content | % by mass | flourescent X-ray analysis | JIS K-2541 | 2.83 |
| Nitrogen content | ppm by mass | Chemiluminescence analysis | JIS K-2609 | 720 |
| Residue carbon content | % by mass | Micro method | JIS K-2270 | 0.68 |
| Kinetic viscosity (@50 deg C.) | mm$^2$/sec | | JIS K-2283 | 32 |
| Distillation characteristics of a fraction of 360 deg C. or more | % by mass | Reduced pressure method | JIS K-2254 | 90 |

TABLE 9

| | Catalyst species | | | | |
|---|---|---|---|---|---|
| | A3 | A5 | A6 | B3 Comparative | B4 Comparative |
| | Example 8 | Example 9 | Example 10 | Example 8 | Example 9 |
| Reaction Temp (deg C.) | 385 | 385 | 385 | 385 | 385 |
| Conversion of a fraction 360 deg C.+ (% by mass) | 82 | 72 | 75 | 70 | 74 |
| Intermediate fraction yield (% by mass)* | 70 | 66 | 67 | 58 | 58 |

*Intermediate fraction yield (% by mass) = the proportion of the fraction between 120 deg C. or mor and 360 deg C. or less in the product oil.

The table 9 shows the higher yield of an intermediate fraction in the case of the catalyst A 5 (Example 9) and the catalyst A 6 (Example 10) at the similar coversion than ones in the case of the catalyst B 3 (Comparative Example 8) and the catalyst B4 (Comparative Example 9). In addition, it is shown that the catalyst A 3 (Example 8) is able to keep the high yield of an intermediate faction even at high conversion.

INDUSTRIAL APPLICABILITY

A hydrocracking catalyst comprising the iron-containing crystalline aluminosilicate of the present invention shows a hydrocracking activity similar to those of conventional hydrocracking catalysts for heavy oil and is able to maintain a high desulfurization rate of intermediate fraction as well as a high selectivity thereof in the range of high hydrocracking conditions by improvement of diffusion of a heavy fraction due to reasonable increase of outer surface area of a zeolite and mesopores volume thereof.

In particular, in the case of applying it to hydrocracking for residue, vacuum gas oil and coker gas oil and the like, it is possible to reduce a nitrogen content by 1 ppm or less and a sulfur content by 10 ppm or less in an intermediate fraction obtainable from the hydrocracking, and also it is easy to achieve production increase of a great quality intermediate fraction without any additional second treatment.

Further, in the case of producing gasoline through a catalytic cracking of heavy oil in a fluidized catalytic cracking plant, it is possible to charge a feed stock oil containing very low contents of nitrogen and sulfur obtained by pre-treatment of the heavy oil by employing the catalyst.

What we claim is:

1. An iron-containing crystalline aluminosilicate, characterized by meeting the following requirements (A) and (B):
   (A) The main component represented as oxides comprises the molar ratio of $SiO_2$ to $Al_2O_3$ having from 20 to 100, and the content of $Fe_2O_3$ therein of from 0.2 to 5.0% by mass,
   (B) The specific surface area thereof of 700 $m^2$/g or more, and an total pore volume of the pore diameter with 200 nm or less comprises 0.6 mL/g or more.

2. A hydrocracking catalyst comprising supporting at least a metal, selected from the metals of the sixth group of the periodic table and of from the eighth to tenth groups thereof, on a carrier comprising from 5 to 85% by mass of the iron-containing crystalline aluminosilicate according to the claim 1 and from 95 to 15% by mass of an inorganic oxide.

3. A process for hydrocracking a hydrocarbon oil, wherein said process comprises subjecting the hydrocarbon oil to hydrocracking in the presence of the hydrocracking catalyst according to claim 2.

4. The process according to claim 3, wherein the hydrocarbon oil is a heavy oil.

5. The process according to claim 4, wherein the heavy oil is at least one heavy oil selected from the group consisting of a heavy gas oil, a vacuum gas oil, a cracked gas oil, a solvent deasphalted oil, an atmospheric residue, a vacuum residue, a solvent deasphalted residue, a thermal cracked residue, a coker oil, a tar sand oil and a shale oil.

* * * * *